United States Patent [19]

Boissevain

[11] Patent Number: 5,117,093

[45] Date of Patent: May 26, 1992

[54] MAINTENANCE OF LINEARITY OF SUPPORT BEAM

[75] Inventor: Mathew G. Boissevain, Los Altos, Calif.

[73] Assignee: Measurex Corporation, Cupertino, Calif.

[21] Appl. No.: 394,207

[22] Filed: Aug. 15, 1989

[51] Int. Cl.$^5$ ............................................. H05B 1/02
[52] U.S. Cl. .................................. 219/494; 219/497; 219/209; 219/201; 73/849
[58] Field of Search .................. 219/201, 209–211, 219/494, 497, 506, 491; 73/800, 849

[56] References Cited

U.S. PATENT DOCUMENTS

| | | | |
|---|---|---|---|
| 3,289,526 | 12/1966 | Tuppeny, Jr. et al. | 73/800 |
| 4,125,845 | 11/1978 | Stevenson, Jr. | 219/496 |
| 4,671,659 | 6/1987 | Rempt et al. | 73/800 |
| 4,719,830 | 1/1988 | Kawada et al. | 219/201 |
| 4,775,214 | 10/1988 | Johnson | 73/800 |
| 4,888,463 | 12/1989 | Middlebrook | 219/201 |
| 4,962,669 | 10/1990 | Gernhart et al. | 73/800 |

Primary Examiner—Mark H. Paschall
Attorney, Agent, or Firm—Spensley Horn Jubas & Lubitz

[57] ABSTRACT

A system for controlling deflections of an elongate body transverse to a longitudinal axis of the body, the system including: a sensor mounted on the body for producing an output signal when the body experiences a deflection in at least one direction transverse to its axis; heating and/or cooling elements thermally coupled to the body at a location for heating or cooling the body in a manner to thermally deflect the body in a direction transverse to the longitudinal axis; and a control unit, connected between the sensor and the heating or cooling elements, responsive to the output signal produced by the sensor.

22 Claims, 4 Drawing Sheets

MAINTENANCE OF LINEARITY OF SUPPORT BEAM

BACKGROUND OF THE INVENTION

The present invention relates to control of the configuration of supporting beams, particularly beams which are subject to deformation due to nonuniform heating.

The present invention was developed particularly for use in the paper making art where horizontally oriented structural beams support scanning sensor-supporting carriages which travel transversely to a paper sheet in order to monitor one or more characteristics of that sheet across its width, such as basis weight (i.e., the mass per unit surface area of the sheet).

Paper sheet is manufactured at elevated temperatures. Thus, the portion of the beam nearest to the paper sheet may be heated by infrared radiation and convection from the sheet. In such installations, since the support beams are subjected to nonuniform heating transverse to their length, this nonuniform heating will cause the beam to bend so that the scanning sensors no longer traverse a linear path. Particularly when bending occurs in a vertical direction, the distance between the sensors and the paper sheet will vary across the width of the sheet, resulting in falsified readings.

Attempts to prevent such beam deformations by additional mechanical supports have met with only limited success in view of the large forces generated by uneven heating.

SUMMARY OF THE INVENTION

The present invention can substantially elminate deformation of a beam due to uneven heating or other causes, without resorting to massive supporting structures. The invention can prevent significant beam deformations without requiring any additional structural support. The invention can substantially prevent such deformations by a thermal compensation system which is structurally simple and inexpensive.

According to the present invention, a system is constructed for counteracting deflections of an elongate body transverse to a longitudinal axis of the body, the system including: sensor means operatively coupled to the body for producing an output signal when the body experiences a deflection in at least one direction transverse to its axis; heating means thermally coupled to the body at a location for heating the body in a manner to deflect the body in a direction opposite to the one direction; and control means connected between the sensor means and the heating means for supplying heating power to the heating means in response to the output signal produced by the sensor means in a manner to counteract deflection of the body in the one direction.

As will be understood by those skilled in the art, cooling devices may be thermally coupled to the beam and used in addition to or in place of the heating means.

DESCRIPTION OF THE PREFERRED EMBODIMENTS

Figure 1:
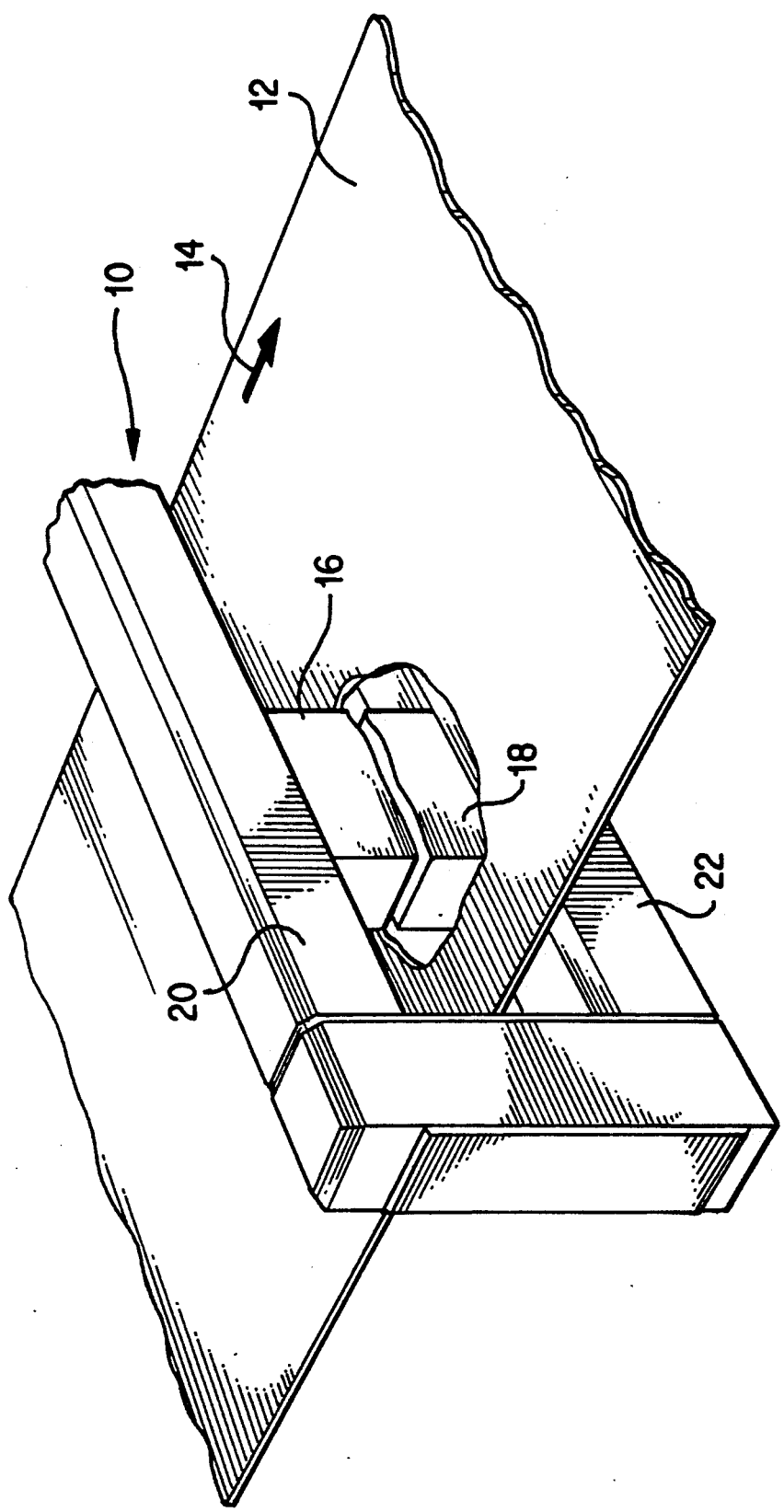
FIG. 1 is a simplified perspective view of a scanning station, or "scanner" used to scan one or more sensors back and forth across the width of a moving sheet of material.

FIG. 1 illustrates a conventional scanner 10 which may be used in the production of paper sheet 12 by a paper making machine (not shown). As the paper sheet 12 exits the paper making machine in the direction of arrow 14, carriages 16 and 18 are driven by a motor (not shown) back and forth in opposing relation on beams 20 and 22. One or more sensors, such as basis weight sensors, moisture sensors and sheet caliper sensors (not shown) may be mounted to the carriages 16, 18 and are thus scanned back and forth across the sheet 12. In FIG. 1, a portion of the sheet 12 has been removed to better illustrate the spacial relationship between carriages 16 and 18.

Figure 2:
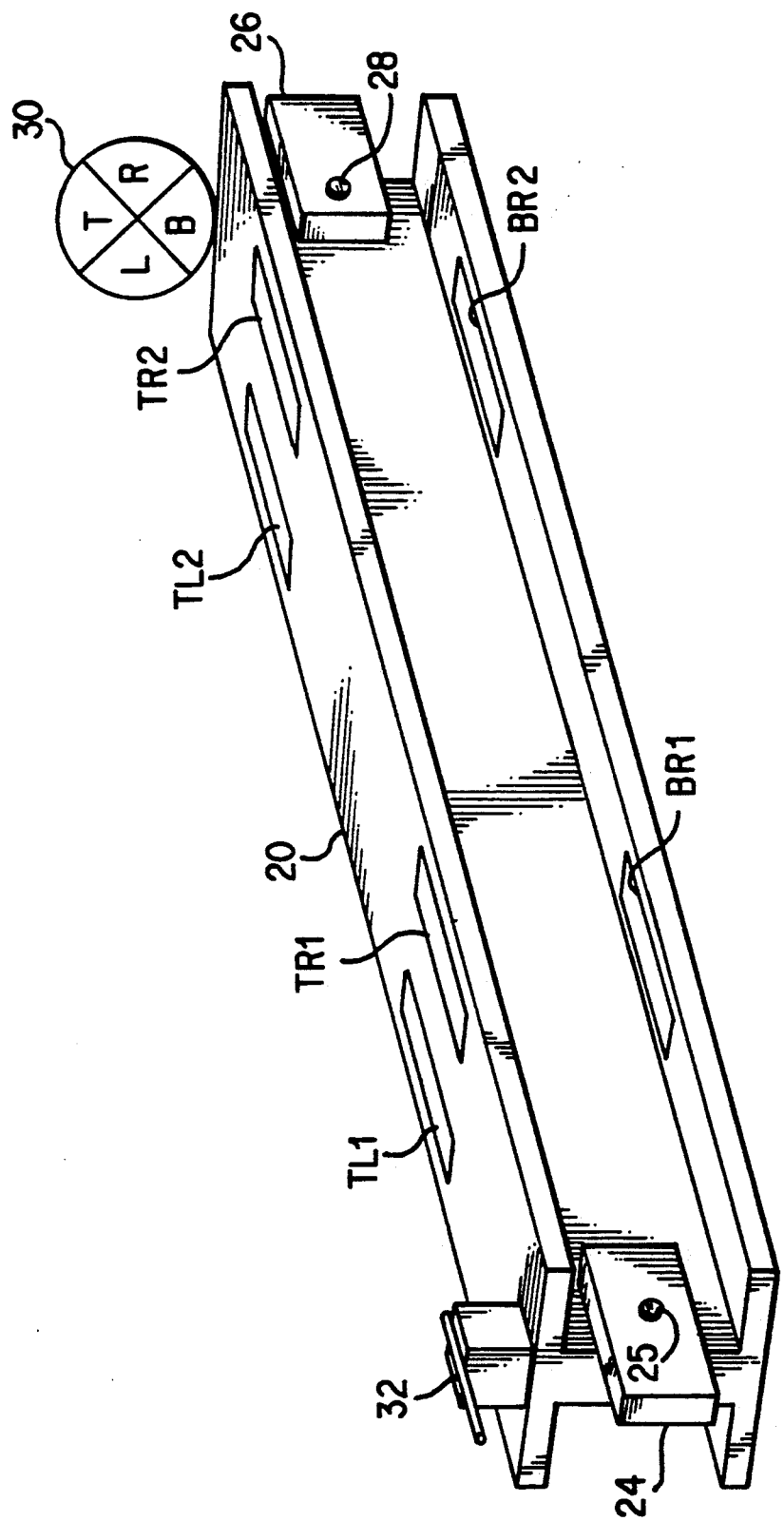
FIG. 2 is a perspective view of a horizontal scanner beam equipped with a deformation compensating structure according to a preferred embodiment of the invention.

FIG. 2 illustrates a beam, such as, for example, beam 20 which is mounted between two fixed vertical supports (not shown in FIG. 2) by means of connecting plates 24 and 26. Plate 24 may be flexibly connected to the vertical web of beam 20 by means of a loose fitting single pin 25, as shown, while, according to the invention, the vertical web of beam 20 may also be connected to plate 26 by means of a similar loose fitting single pin 28. Both plates 24, 26 are held to beam 20 in a manner to permit beam 20 to undergo vertical and horizontal deflections without imposing undue strains on the plates 24, 26, and while maintaining the position of the ends of beam 20 substantially constant. Beam 20 may be provided with any suitable structure presenting a track for displacement of a scanner carriage along the length of the beam 20.

In an environment where large temperature differentials exist, it is quite common for such a beam to be unequally heated transverse to its length. For example, in the case of a beam disposed above a paper sheet in a paper making machine, the lower flange of the beam will be heated substantially more than the upper flange thereof. Moreover, conditions can exist which will cause one side of the beam to be heated to a higher temperature than the other side.

According to the invention, a laser 32 (or other source of highly collimated light), is mounted at one end of beam 20 in order to emit a narrow, collimated light beam in the direction of the opposite end of the beam 20. At that opposite end, there is disposed a light responsive target 30 mounted to the beam 20 and composed of four quadrants (labeled T, B, L and R for top, bottom, left and right, respectively), each quadrant having a separate electrical output. Each quadrant may include a separate photovoltaic cell. Initially, laser 32 and target 30 are positioned so that when beam 20 is perfectly straight, i.e., experiences no deflection either in a horizontal plane or vertical plane, the narrow collimated laser light beam illuminates all four quadrants equally. For example, the laser beam and target may both be 0.25 inch in diameter.

As beam 20 experiences a thermally induced deflection or bending, which will cause its end faces to be inclined to one another, the laser beam will travel across the face of target 30 so that the four quadrants are no longer uniformly illuminated. Target 30 is a light sensitive device having a respective output conductor 34, 36, 38 and 40 connected to each quadrant (see FIG. 3), with each conductor 34, 36, 38 and 40 being supplied by the associated quadrant with a current proportional to the amount of the quadrant which is illuminated. Thus, the direction of any deflection experienced by beam 20 can be indicated by comparing the current outputs from the four quadrants.

Beam 20 further carries a plurality of electric resistance heater elements TL1, TL2, TR1 . . . BR1 and BR2. Each of these elements may be constituted by a conventional electric heater strip or wire bonded to an associated beam flange. According to a preferred embodiment of the invention, there are a total of eight such heater elements, only six of which are visible in FIG. 2, it being understood that another pair of such elements, which, if visible, would be denoted BL1 and BL2 mounted on the bottom flange at the far side of the vertical web. The notation employed in FIG. 2 for the heater elements has the following significance: T=top; B=bottom; L=left; and R=right. The heater elements are connected to power sources 56 (FIG. 3) which are controlled by the output signals from the four quadrants of target 30.

Figure 3:
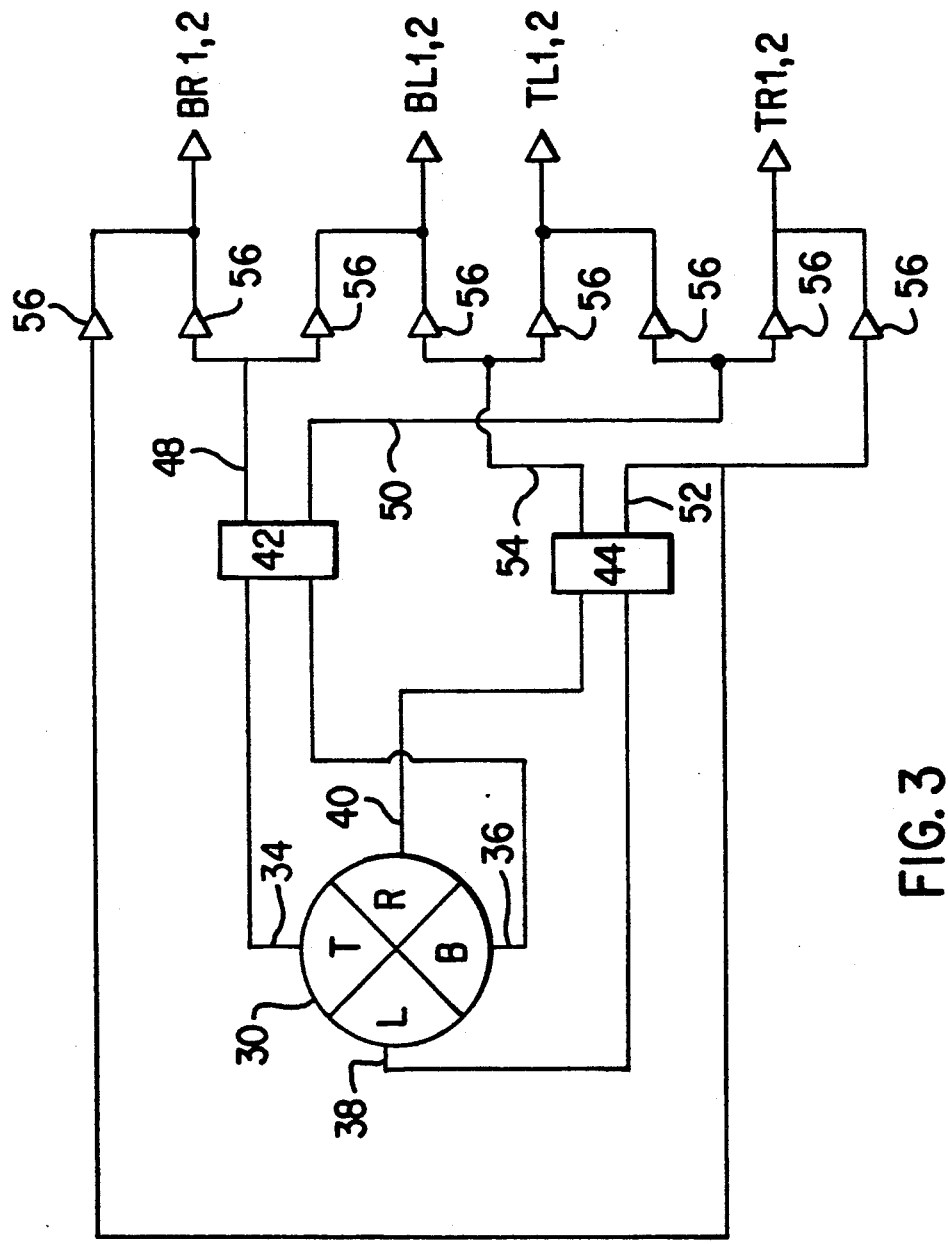
FIG. 3 is a simplified circuit diagram of a control system for the components shown in FIG. 2.

The basic electronic components of one embodiment of a beam bending control system according to the present invention are illustrated in FIG. 3, where each quadrant of target 30 has an output conductor 34, 36, 38 and 40 connected to a control circuit 42, 44. Such a control system may be used to counteract thermally induced bending in a horizontal scanner support beam. The control circuit 42 compares the output of the top and bottom quadrants. When a greater portion of the top quadrant is illuminated relative to the bottom quadrant, control circuit 42 produces an output voltage on line 48 proportional to the difference in illumination of these two quadrants. Conversely, when a greater portion of the bottom quadrant is illuminated relative to the top quadrant, control circuit 42 produces an output voltage on line 50 proportional to the difference in illumination of these two quadrants. Many simple analog and/or digital electronic circuits for comparing two input currents and producing voltages on different wires dependent on the difference between such currents are well-known and can be easily constructed by those skilled in the art. Accordingly, such circuits will not be described in detail herein.

Control circuit 44 functions in a similar manner. When a greater portion of the left quadrant is illuminated relative to the right quadrant, control circuit 44 produces an output voltage on line 52 proportional to the difference in illumination between these two quadrants. Conversely, when a greater portion of the right quadrant is illuminated relative to the left quadrant, then control circuit 44 produces an output voltage on line 54 proportional to the difference in illumination between these two quadrants.

The output voltages from control circuits 42 and 44 are then supplied to associated amplifiers 56 which are each connected to supply a respective pair of heater elements with operating power proportional to the magnitude of the signal supplied by the associated control circuits 42 and 44. Amplifiers 56 perform primarily a signal isolation function and each has a fixed gain which may be equal to unity or which may produce a voltage amplification, depending on the level of the output signals supplied by the control circuits 42, 44 and the requirements of the heating elements.

As can be appreciated from a consideration of FIG. 3, each control circuit 42, 44 controls the delivery of operating power to those heating elements which must be operated in order to compensate for a thermal deflection experienced by beam 20 in a given direction. Thus, by way of example, if the lower flange of beam 20 (FIG. 2) should be heated to a higher temperature than the upper flange thereof, beam 20 will deflect downwardly at its center, causing the laser light beam from laser 32 to preferentially illuminate the bottom quadrant of target 30 relative to the top quadrant. To compensate for this deflection, heating power is supplied to heating elements TL1, TL2, TR1 and TR2 bonded to the upper flange of beam 20. As the temperature of the upper flange is raised and the upper flange thermally expands, beam 20 returns to its undeflected condition, accompanied by a displacement of the laser beam toward the top of target 30. Thus, all four quadrants are again uniformly illuminated. As beam 20 returns to its undeflected condition, the supply of operating power to the associated heaters is progressively diminished. This helps to prevent overshooting in the heating supplied to beam 20.

It can correspondingly be seen that if unequal heating of beam 20 causes the center of the beam to be deflected toward the right, the laser beam will illuminate a greater portion of the right quadrant of target 30, relative to the left quadrant, resulting in an output signal from control circuit 44 which increases the supply of heating power to the heating elements along the left-hand side of beam 20.

It will be appreciated that if beam 20 is to be disposed at a location where the environmental temperature gradients will produce deflections in only certain directions, then some of the heating elements and the associated control circuitry can be eliminated. In addition, for certain applications, the two heating elements along each edge of beam 20 can be replaced by a single heating element.

Rather than using discrete analog and/or digital control circuits 42, 44, the target 30 may be coupled to the paper mill central process control computer, via appropriate analog to digital converters, and the computer programmed to control the heaters in the manner previously described.

Figure 4:
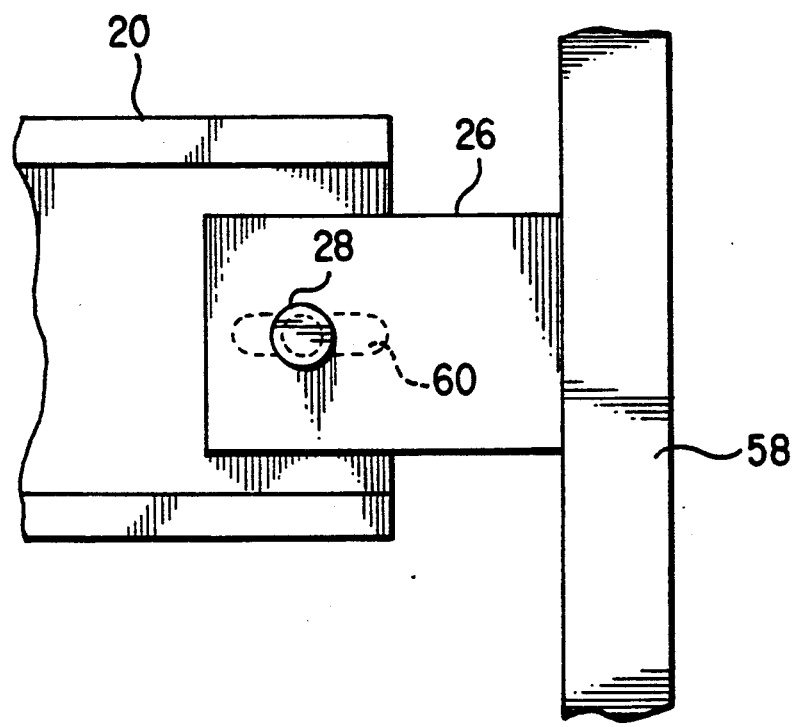
FIG. 4 is an elevation detail view of the supporting structure at one end of a beam equipped with a system according to the present invention.

When beam 20 experiences bending deflections of the type described above, it is preferable that these deflections not introduce significant strains in the vertical support members. For this purpose, as mentioned above, the support plate 26 at one end of beam 20 supports the beam 20 by means of a single pin 28, as shown in greater detail in FIG. 4 which also shows a vertical support member 58 carrying plate 26. Pin 28 may extend through a longitudinal slot 60 in the vertical web of beam 20 in order to allow beam 20 to experience longitudinal expansion and contraction. Support plate 24, pin 25 and an associate vertical support member (not shown) are held together in this same manner.

According to other embodiments of the invention, various known types of deflection sensors can be mounted in place of the laser 32 and target 30 to sense beam deflection in one or more directions transverse to the beam axis and can be connected to control the supply of heating power to suitably positioned heating elements. For example, one or more inductive proximity sensors (not shown) may be coupled to the scanner carriages 16, 18 (FIG. 1) and used to continuously monitor the spacing between such carriages as the carriages scan back and forth along the support beams 20, 22. If, for example, a different spacing is detected between the carriages 16, 18 near the center of the beam 20 than at the beam ends, then the heating of the beam 20 could be adjusted to deflect the beam back to a more nearly uniformly spaced configuration. Such inductive proximity sensors are well-known in the art and include a coil having an impedence which varies with distance from a conductive reference surface or opposing coil. Therefore, an inductive coil mounted on one carriage can be used to measure the spacing to the opposing carriage. An example of such an inductive proximity sensor is disclosed in commonly assigned U.S. Pat. No. 4,678,915, entitled System and Process for Measuring and Correcting the Values of a Parameter of a Sheet Material, issued Jul. 7, 1987 to Dahlquist, et al. This patent is incorporated herein by reference. In this situation, the inductive proximity sensor is preferably coupled to the paper mill process control computer which is programmed to control the heaters to achieve the desired beam shape.

While the present description refers to an I-beam, it will be appreciated that the invention is applicable to any suitable beam cross-section, which will be selected on the basis of the function the beam is to perform.

While the description above refers to two particular embodiments of the present invention, it will be understood that many modifications may be made without departing from the spirit thereof. For example, the present invention may be used with many types of beams and sheet material other than those beams used as horizontal scanning sensor supports in the paper making industry. Thus, the present invention may be used with beams disposed vertically as well as horizontally, or at any other angle. Moreover, the present invention may be used to create and maintain beam curvatures, as well as to counteract such curvature. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A system for controlling deflections of an elongate body transverse to a longitudinal axis of the body, said system comprising:
   a deflection sensor including a source and a detector, at least one of which is adapted to be operatively coupled to the body, the sensor being operable to produce an output signal indicative of the deflection of the body in at least one direction transverse to its axis;
   at least one temperature control device thermally coupled to the body at a location for changing the temperature of a portion of the body in a manner to deflect the body in a direction opposite to the one direction; and
   control means connected between said sensor and said at least one temperature control device for controlling the temperature control device in response to the output signal produced by said sensor in a manner to counteract deflection of the body in the one direction.

2. A system as defined in claim 1, wherein the temperature control device is a heater and said control means is operative for supplying heating power to the heater in an amount proportional to the extent of the deflection of the body in the one direction.

3. A system as defined in claim 2, wherein said control means cause the heating power to be linearly proportional to the extent of deflection of the body in the one direction.

4. A system as defined in claim 2, wherein the body has two opposed longitudinal ends and wherein:
   the source comprises means mounted on the body in the vicinity of one of the ends for emitting a narrow collimated light beam which is fixed relative to the one end and which is directed toward the other end; and
   the detector comprises light sensing means mounted on the body in the vicinity of the other end and fixed relative to the other end at a location to intercept the light beam.

5. A system as defined in claim 4, wherein said light sensing means has a light sensing surface extending transversely to the light beam and operative to produce output signals representative of the spacial relationship between the light sensing surface and the light beam.

6. A system as defined in claim 5, wherein said light sensing surface includes four quadrants which are disposed to be uniformly illuminated by the light beam only when the body is undeflected.

7. A system as defined in claim 1, comprising a plurality of temperature control devices thermally coupled to the body, wherein:
   each temperature control device includes a heating element thermally coupled to the body at a location for heating the body in a manner to deflect the body in a direction opposite to a respective one of a plurality of different directions transverse to the longitudinal axis of the body;
   said sensor has a plurality of signal outputs, each producing an output signal when the body experiences a deflection in a respective one of the different directions; and
   said control means supplies heating power to the heating elements in response to the output signals.

8. A system as defined in claim 1, wherein the body has two opposed longitudinal ends, the system further comprising means supporting the body for permitting angular movements of one longitudinal end of the body relative to the other longitudinal end thereof.

9. A system as defined in claim 1, wherein the body is a horizontal beam of a scanner.

10. A method for controlling the shape of an elongate body transverse to a longitudinal axis of the body, the method comprising the steps of:
    sensing deflection of the body along substantially the entire length of the body in at least one direction transverse to the axis; and
    altering the temperature of a portion of the body in response to the sensed deflection.

11. The method of claim 10, wherein the temperature of the portion of the body is altered by heating the portion of the body.

12. The method of claim 11, wherein the portion of the body opposite the one direction is heated to counteract the sensed deflection.

13. The method of claim 11, wherein the amount of heating is controlled to be proportional to the amount of sensed deflection.

14. The method of claim 10, wherein the sensing step includes sensing the deflection of a horizontal sensor-supporting beam of a scanner.

15. A system, as defined in claim 1, in which the output signal is indicative of the overall deflection of the elongate body.

16. A system, as defined in claim 1, in which the output signal is indicative of the deflection of the elongate body along substantially the entire length of the body.

17. A system, as defined in claim 1, in which the sensor is an inductive proximity sensor.

18. A system, as defined in claim 1, in which the sensor includes a laser and a photosensitive laser beam target mounted on the elongate body.

19. A system, as defined in claim 9 wherein the horizontal beam is supported at its ends.

20. A system, as defined in claim 19, wherein the sensor is an inductive proximity sensor.

21. The method of claim 10, wherein the sensing step is performed inductively.

22. The method of claim 10, wherein the sensing step is performed optically.

* * * * *